No. 778,265. PATENTED DEC. 27, 1904.
J. A. PLACE.
LUBRICATOR.
APPLICATION FILED APR. 2, 1904.

Witnesses
Chas. F. Clagett
Josephine Rice

Inventor
John A. Place
By his Attorney
Wm. N. Stockbridge

No. 778,265.

Patented December 27, 1904.

UNITED STATES PATENT OFFICE.

JOHN A. PLACE, OF GENEVA, NEW YORK.

LUBRICATOR.

SPECIFICATION forming part of Letters Patent No. 778,265, dated December 27, 1904.

Application filed April 2, 1904. Serial No. 201,252.

*To all whom it may concern:*

Be it known that I, JOHN A. PLACE, a citizen of the United States, residing at Geneva, New York, have invented certain new and useful Improvements in Lubricators, of which the following is a specification.

My invention relates to lubricators, the same being especially intended for use upon automobiles and the like, although it is capable of being used in connection with any kind of machinery.

The invention relates particularly to that class of lubricators in which a cylinder or receptacle for the lubricant is employed having a longitudinally-movable piston therein which forces the lubricant through passages in one of the cylinder-heads.

The object of the invention is to provide a novel construction of cylinder whereby the body of the same may be readily disconnected from and reconnected to one of its heads for facilitating the filling of the cylinder with heavy or cup grease.

A further object of the invention is to provide novel means for automatically arresting the longitudinal movement of the piston when it approaches the end of its stroke in one direction, so as to prevent the jamming of the same into the cylinder-head.

Other objects and advantages of the invention will hereinafter appear, and the novel features thereof will be set forth in the claims.

Figure 1:
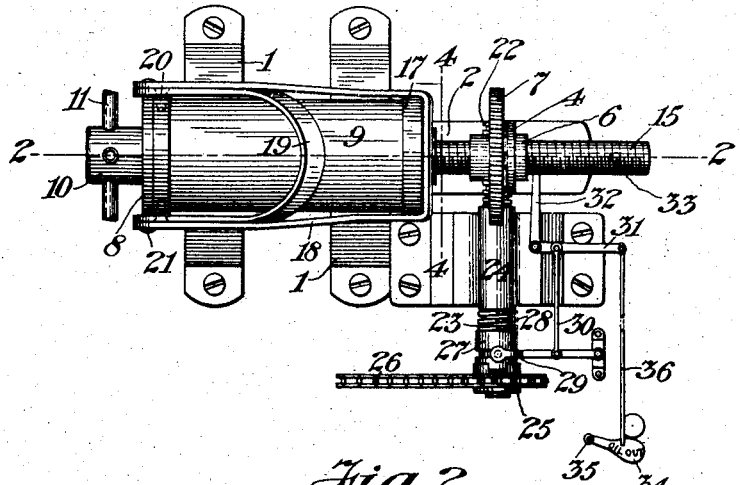
Figure 2:
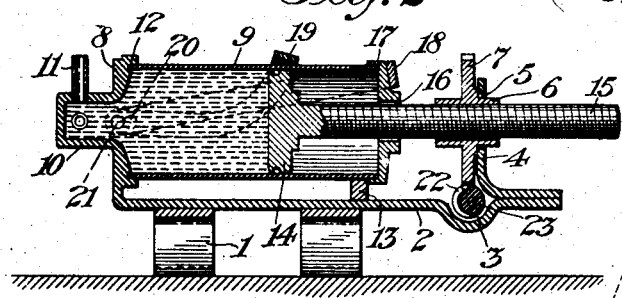
Figure 3:
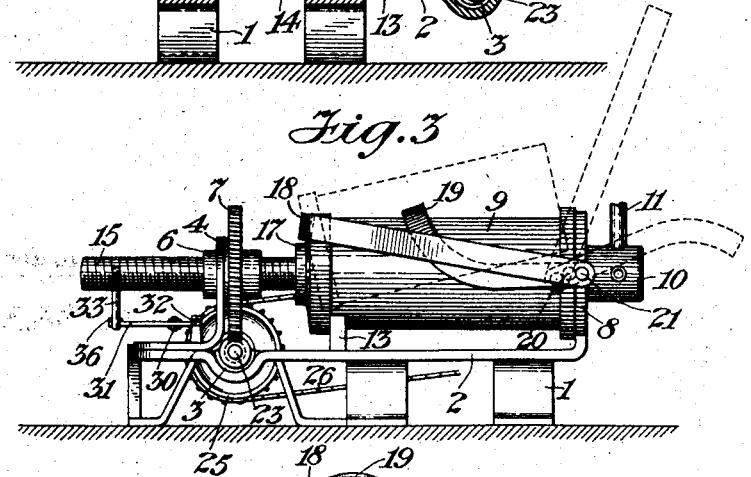
Figure 4:
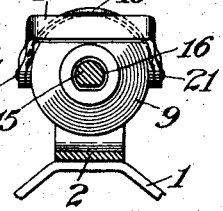

In the drawings forming part of this specification, Figure 1 is a top plan view of a lubricator embodying my improvements. Fig. 2 is a vertical longitudinal section on the line 2 2 of Fig. 1. Fig. 3 is an elevation of the same, showing the clamping straps or levers for the body of the cylinder in full lines in their locked positions and in dotted lines in their unlocked positions. Fig. 4 is a detail sectional view on the line 4 4 of Fig. 1.

Like reference-numerals indicate like parts in the different views.

Mounted upon suitable supports, such as the brackets 1, is a base-plate 2, which is depresssed adjacent to one end, forming in its upper surface a transversely-extending recess 3. Secured to the base-plate is an upright or standard 4, having an opening 5 therein constituting a bearing for the hub 6 of a worm-wheel 7. At the opposite end of the base-plate 2 is secured the fixed head 8 of a cylinder 9 for the reception of the grease or other lubricant. The cylinder-head 8 is provided with an extension 10, from which projects a plurality of nozzles or nipples 11, through which and suitable pipes or tubes (not shown) the lubricant is caused to flow to the various bearings. The extension 10 and the nipples 11 are of course hollow and communicate with the front face of the head 8. Said front face is provided with an annular recess or groove 12, within which is adapted to fit one end of the cylinder 9. The said cylinder when the parts of the device are in operative positions rests upon a chair or support 13, rising from the base-plate 2.

Fitting within the cylinder 9 is a piston 14, the same having secured thereto a screw-threaded piston-rod 15, which extends freely through an opening 16 in the head 17 of the cylinder, which is opposite the head 8, heretofore referred to. The said head 17 is permanently secured to the body of the cylinder 9, and the opening 16 therein is provided with one flat face, as clearly shown in Fig. 4 of the drawings. The piston-rod 15 is formed with a corresponding flat face, these two parts cooperating with each other to prevent the turning movement of said piston-rod, while permitting of its direct longitudinal movement. The worm-gear 7 fits upon the projecting end of the piston-rod 15, and the hub 6 of said gear is provided with internal screw-threads which mesh with the threads of said piston-rod. It will thus be seen that by turning the gear 7 and preventing the turning movement of the piston-rod 15 a longitudinal movement will be imparted to said piston-rod.

The cylinder 9 is made separate from the cylinder-head 8 in order to permit the former to be readily disconnected from the latter for the purpose of filling the same with lubricant. When filled, however, it is necessary to provide some means for locking said cylinder firmly to the head 8, so as to prevent leakage at the joint between these parts. The means provided by me for this purpose consists of a pair of coöperating locking straps or levers 18 and 19. The strap 19 straddles or embraces the cylinder-head 8 and is pivoted at 20 thereto at a point a short distance from the free end of each of its members. The strap or lever 18 is pivoted at 21 to the free end of the strap or lever 19, so that it may be moved toward and away from the cylinder-head 17, which it is intended to engage when in locking position. To apply the cylinder 9 to its head 8, it is merely necessary to insert the hub 6 into the opening 5 in the standard 4, throw said cylinder down until it rests upon the chair 13, move it longitudinally until the open end thereof fits within the annular groove or recess 12 in the head 8, lift the strap or lever 19 to an upright position, and throw the strap or lever 18 down until it overlaps the end of the cylinder-head 17. To complete the lock and form a seal between said cylinder and its head 8, the strap or lever 18 is forced downwardly until the arched portion thereof rests upon the upper side of said cylinder. This action forces rearwardly the pivot 21 on the strap 18 and brings about close engagement between the cross-bar connecting the two members or branches of the strap 18 and the cylinder-head 17. When the parts are in these positions, the cylinder is locked against displacement and all danger of leakage between it and the head 8 is prevented. To disconnect the cylinder and remove it for the purpose of filling, a reverse of the operations above described will be performed.

To effect the turning movement of the gear 7 and the consequent longitudinal movement of the piston 14, I provide a worm 22, which meshes with said gear and is located in the recess 3 in the base-plate 2. This worm is secured to, connected with, or formed upon the transversely-extending shaft 23, which is mounted in suitable bearings in a bracket or support 24. On one end of the shaft 23 is loosely mounted a gear-wheel 25, which has been shown in the form of a sprocket-wheel having a chain 26 thereon, through which it is rotated from the driving-axle, drive-shaft, or other source of power. The gear-wheel 25 is connected to the shaft 23 by means of a longitudinally-movable clutch 27, having a feather connection with said shaft, so that while it is turned therewith it is capable of longitudinal movement thereon. This clutch is normally held in engagement with the gear-wheel 25 by means of a spring 28. Loosely connected with said clutch by means of pins which fit within an annular groove therein is a forked lever 29, which latter is connected, through a rod, cord, chain, or other form of connecting device, with one arm, 31, of a bell-crank lever. The other arm, 32, of said bell-crank lever lies within the path of movement of a pin or projection 33 on the piston-rod 15, heretofore referred to. The result of this construction is that when the piston 14 approaches the cylinder-head 8 at one end of its stroke the pin 33 will be brought into engagement with the arm 32 of the bell-crank lever, the other arm, 31, of said lever will be moved toward the piston-rod 15, and the clutch 27 will be moved longitudinally on the shaft 23, so as to be disengaged from the gear-wheel 25. The said gear-wheel is then free to rotate without effecting a corresponding movement of the shaft 23 and the further longitudinal movement of the piston 14. Jamming of the piston 14 into the cylinder-head 8 is thereby automatically prevented.

When the piston 14 reaches the position above described, the grease or lubricant in the cylinder 7 will have become exhausted. In order, therefore, to indicate this state of facts to the driver, engineer, or other operator of the machine to which the device is applied, I provide a signaling mechanism in the form of an annunciator 34 at any suitable point, the same being pivoted at 35 and connected, through the rod or chain 36, with the arm 31 of the bell-crank lever. When said bell-crank lever is tripped, therefore, to arrest the movement of the piston 14, the annunciator 34 will be automatically actuated to indicate to the operator that the oil receptacle or cylinder 9 needs refilling. Of course any suitable kind of connecting device between the annunciator 34 and the piston-rod 15 may be substituted for that shown and described.

The form of cylinder 9 is one which is particularly adapted for heavy or cup grease. When soft oil is employed as the lubricant, it is not necessary that the body of the cylinder be capable of disconnection from the head 8. When the latter form of cylinder is employed, it is of course necessary that some suitable filling means therefor be provided. With some kinds of machines it is frequently necessary to use both heavy and light oils as lubricants, one kind for one set of bearings and another kind for another set of bearings. In such cases I may duplicate the parts above described, using the form of cylinder illustrated for the heavy oil and the other form for the light or soft oil. These, however, are mere details which would suggest themselves to any one conversant with the requirements.

Having now described my invention, what I claim as new, and desire to secure by Letters Patent, is—

1. In a lubricator, the combination with an oil receptacle or cylinder and one of its heads, of means for locking these parts together, the same consisting of a pair of pivoted straps or levers, one of which is pivoted to one of said parts and the other of which is adapted to engage the other of said parts.

2. In a lubricator, the combination with an oil receptacle or cylinder and one of its heads, of means for locking these parts together, the same consisting of a strap or lever fulcrumed to said head and a second strap or lever pivoted to the first at a point beyond its fulcrum and adapted to engage the opposite end of said cylinder.

3. In a lubricator, the combination with an oil receptacle or cylinder and one of its heads, the head being fixed in position and the cylinder being separable therefrom, of means for locking these parts together, the same consisting of a pair of pivoted straps or levers, one of which is pivoted to said head and the other of which is adapted to engage the opposite end of said cylinder.

4. In a lubricator, an oil receptacle or cylinder, a longitudinally-movable piston therein, operating mechanism for said piston, a clutch for connecting and disconnecting the piston and its operating mechanism, a bell-crank lever, a rod connecting one arm of said lever with said clutch, and a pin or projection on the piston-rod adapted to engage the other arm of said lever for throwing out said clutch and arresting the movement of said piston when it approaches one end of said cylinder.

5. In a lubricator, an oil receptacle or cylinder, a longitudinally-movable piston therein having the piston-rod externally screw-threaded and extending loosely through an opening in one of the heads of said cylinder, means for preventing the turning of said piston-rod, a worm-gear whose hub is provided with internal screw-threads which mesh with the threads on said piston-rod, a transverse shaft having a worm connected thereto which meshes with said gear, a driven gear loosely mounted on said shaft, a longitudinally-movable clutch on said shaft for connecting the latter with said driven gear, a spring for normally maintaining said clutch in engagement with said driven gear, a bell-crank lever, a rod connecting one arm of said lever with said clutch, and a pin or projection on the piston-rod adapted to engage the other arm of said lever for disconnecting said clutch from said driven gear and arresting the movement of the piston when it approaches one end of said cylinder.

In testimony whereof I have hereunto set my hand in presence of two subscribing witnesses.

JOHN A. PLACE.

Witnesses:
GEORGE A. GILBERT,
WM. S. MOORE.